Patented Sept. 7, 1937

2,092,723

UNITED STATES PATENT OFFICE 2,092,723

PREPARATION OF ACID AMIDES

John L. Brill and Richard W. Plummer, Newark, Del., assignors to E. I. du Pont de Nemours & Company, Wilmington, Del., a corporation of Delaware No Drawing. Application July 20, 1935, Serial No. 32,405

13 Claims. (Cl. 260—124)

This invention relates to a process for the preparation of acid amide and more particularly to the preparation of formamide by the interaction of the alkyl formates with ammonia.

An object of the present invention is to provide an improved process for the preparation of the acid amides from the carboxylic acid esters and ammonia. Another object of the invention is to provide a continuous process for effecting these reactions. A further object of the invention is to provide a process for the preparation of formamide by the interaction of an alkyl formate with ammonia in which many of the disadvantages heretofore considered to be inherent in the process have been eliminated. Yet another object of the invention is to provide a continuous process wherein the reaction is terminated under temperature and pressure conditions at which the overall conversion is high and as a result there is obtained an excellent yield of the desired products on a single pass thru the apparatus. Other objects and advantages of the invention will hereinafter appear.

The reaction is conducted in accord with the present invention by effecting the interaction of the ammonia with an alkyl acylate, such, for example, as methyl formate, ethyl formate, propyl formate, isobutyl formate, methyl acetate, propyl acetate or the higher alkyl acetates or analagous higher alkyl acylates in a continuous manner. Generally the reaction is conducted by mixing a previously prepared acid amide with the carboxylic acid ester to be reacted, the acid amide being preferably preheated prior to or subsequent to the introduction of the acid amide. The resulting mixture of carboxylic acid ester and acid amide is passed into a suitable reaction vessel. Thereafter anhydrous ammonia is added and under elevated temperatures ranging up to approximately 130° C., and in some instances higher and pressures ranging from 50–500 pounds/sq. in., the acid amide are produced. The reaction mixture, comprising essentially the acid amide, the alkyl formate, alcohol, and unreacted ammonia, is then distilled for the recovery of the acid amide.

In accordance with the present invention, the reaction is conducted in a continuous manner. The alkyl acylate, such, for example, as methyl formate with ammonia is continuously charged into a pressure sustaining vessel, the alkyl acylate preferably in excess, the vessel preferably having great length relative to cross section. When initiating the operation of such an apparatus, it is usually desirable to pass into the vessel, together with the reactants, small portions of the product to be produced, it having been found that the reaction can be caused to proceed more smoothly and under less vigorous conditions, in the continuous apparatus, if there is added with the reactants from 0.5–5.0% of the amide to be produced. The reaction is thereby induced without the possibility of encountering a dangerous induction period.

The reaction product, obtained when using a slight excess of alkyl formate with ammonia, contains formamide, methanol, methyl formate and traces of free ammonia, the alkyl formate being used in excess to insure that no more than traces of ammonia be present. If this mixture is subjected to distillation in the ordinary manner for the recovery of the formamide, considerable reversion of the formamide to the alkyl formate and ammonia and other by-products will occur. It has, however, been found that if this crude mixture is subjected to continuous flash distillation at subatmospheric pressures, the traces of unconverted ammonia and alkyl formate, together with methanol present, will readily distill over, leaving the formamide in the still pot with only inconsiderable reversion, possibly occurring in the lower portion of the still. We prefer to conduct the flash distillation at subatmospheric pressure say at from 50–300 mm. pressure while maintaining the temperature of from 100–130° C., in the still pot. Furthermore, it has been found that the material of which the distillation column is constructed has considerable influence on the reversion of the formamide. For instance, if an aluminum column is employed, much greater reversion results than when a stainless steel type column is used. This has been attributed to the fact that a small amount of aluminum alcoholate is formed, which acts as a catalyst for the reversion of the formamide. Moreover, mild steel is unsatisfactory for use because of its tendency to corrode with the reactants and products of the reaction. Columns which are made preferably of ferrous alloys, such, for example, as stainless steels with high nickel, chromium, tungsten and/or molybdenum content, apparently do not have this catalytic effect and for that reason are more suitable for the distillation of the crude mixture than are columns made of iron.

We shall now illustrate by way of example a method of conducting the process, but it will be understood that the present invention will not be limited thereto.

Formamide is made in a continuous manner in a converter consisting of a long pipe of approximately 1½" inside diameter and 45' in length. A solution containing 17 parts by weight of ammonia and 66 parts by weight of methyl formate with 0.5-5.0 parts of formamide is pumped in. Within the first 16 feet of the tube the temperature is permitted to rise to from 90 to 110° C., and thereafter heat is removed to cause a continuous drop in temperature to around 30-40° C., which is attained at substantially the end of the tube. The reaction conditions are such that a 97-98% conversion to formamide is obtained. The time of passage of the reactants thru the tube is approximately 1¼ hours and the pressure within the tube is maintained at approximately 150 pounds per square inch. The reaction mixture issuing continuously from the tube passes directly into a flash still, (i. e., a still wherein small quantities of the crude product are very rapidly heated in order that the products other than formamide may be distilled as quickly as possible from the formamide), from which is distilled off a mixture containing approximately 0.04 part of unconverted ammonia, 6 parts of methyl formate, and 32 parts methanol. The formamide is discharged from the pot of the flash evaporator.

Our process may be utilized for the conversion of carboxylic acid esters generally to acid amides as well as for the conversion, as specifically illustrated, of methyl formate to formamide. For example, formamide may be prepared by reacting ammonia with methyl formate, ethyl formate, propyl formate, normal and iso-butyl formate, and the higher alkyl formates. Acetamide may be prepared by the reaction of ammonia with methyl acetate, ethyl acetate, and the higher aliphatic acetates, and in like manner the higher amides may be produced, such, for example, as propionamide from methyl propionate, butyramide from methyl butyrate, and the higher acid amides from the esters of the corresponding acids by reacting them with ammonia in accord with the process as hereinbefore described.

From a consideration of the above specification it will be appreciated that many changes and improvements may be made in the invention as described without departing from its scope or sacrificing any of the advantages that may be derived therefrom.

We claim:

1. In a process for the preparation of an acid amide by the interaction of ammonia with an alkyl acylate of a lower fatty acid, the steps which comprise continuously passing ammonia and an excess of alkyl acylate into the reaction zone maintained at a temperature not exceeding 130° C. and a pressure of from 50 to 500 pounds per square inch and continuously removing from the reaction zone the products of the reaction.

2. In a process for the preparation of formamide by the interaction of ammonia with an alkyl formate, the steps which comprise continuously passing ammonia and an excess of alkyl formate into the reaction zone maintained at a temperature not exceeding 130° C. and a pressure of from 50 to 500 pounds per square inch and continuously removing from the reaction zone the products of the reaction.

3. In a process for the preparation of formamide by the interaction of ammonia with methyl formate, the steps which comprise continuously passing ammonia and an excess of methyl formate into the reaction zone maintained at a temperature not exceeding 130° C. and a pressure of from 50 to 500 pounds per square inch and continuously removing from the reaction zone the products of the reaction.

4. In a process for the preparation of formamide by the interaction of ammonia with isobutyl formate, the steps which comprise continuously passing ammonia and an excess of isobutyl formate into the reaction zone maintained at a temperature not exceeding 130° C. and a pressure of from 50 to 500 pounds per square inch and continuously removing from the reaction zone the products of the reaction.

5. In a process for the preparation of formamide by the interaction of ammonia with ethyl formate, the steps which comprise continuously passing ammonia and an excess of ethyl formate into the reaction zone maintained at a temperature not exceeding 130° C. and a pressure of from 50 to 500 pounds per square inch and continuously removing from the reaction zone the products of the reaction.

6. In a continuous process for the preparation of an acid amide by the interaction of ammonia with an alkyl acylate of a lower fatty acid, the steps which comprise continuously passing an alkyl acylate, ammonia and the acid amide to be prepared as a seeding agent into the reaction zone, discontinuing the addition of the seeding agent after the reaction starts and continuously removing from the reaction zone the products of the reaction.

7. In a continuous process for the preparation of formamide by the interaction of ammonia and methyl formate, the steps which comprise continuously passing into a reaction zone methyl formate, ammonia, and formamide as a seeding agent, initiating the reaction between the methyl formate and ammonia at a temperature of approximately 90-110° C., and a pressure of approximately 50 to 500 pounds per square inch, completing the reaction at a temperature of approximately 30 to 40° C., and a pressure of 50 to 500 pounds per square inch, and recovering the formamide by the removal of methanol and methyl formate by flash evaporation.

8. In a continuous process for the preparation of formamide by the interaction of ammonia and methyl formate, the steps which comprise continuously passing into a reaction zone 66 parts by weight of methyl formate, 17 parts by weight of ammonia and 0.5 to 5.0 part of formamide initiating the reaction between the methyl formate and ammonia at a temperature of approximately 90-110° C., and a pressure of from 50 to 500 pounds per square inch, completing the reaction at a temperature of approximately 30 to 40° C., and recovering the formamide by the removal of methanol and methyl formate by flash evaporation.

9. In a process for the preparation of an acid amide by the interaction of ammonia with an alkyl acylate of a lower fatty acid, the steps which comprise continuously passing into a reaction zone the alkyl acylate and ammonia, starting the reaction between the alkyl acylate and ammonia at a temperature between 90° and 130° C. and completing the reaction at a temperature below 40° C., continuously removing from the reaction zone the product of the reaction and recovering the acid amide by the removal of the alcohol and alkyl acylate by flash evaporation.

10. In a process for the preparation of formamide by the intersection of ammonia with an alkyl formate the steps which comprise continuously passing an alkyl formate and ammonia into a reaction zone wherein the reaction is started at a temperature between 90° C. and approximately 130° C. and completed at a temperature not exceeding 40° C.

11. In a process for the preparation of formamide by the interaction of ammonia with methyl formate the steps which comprise continuously passing methyl formate and ammonia into a reaction zone wherein the reaction is started at a temperature between 90° C. and approximately 130° C. and completed at a temperature not exceeding 40° C.

12. In a continuous process for the preparation of formamide by the interaction of ammonia with an alkyl formate the steps which comprise continuously passing the alkyl formate, ammonia and formamide as a seeding agent into the reaction zone, discontinuing the addition of the formamide after the reaction has started and continuously removing from the reaction zone the products of the reaction.

13. In a continuous process for the preparation of formamide by the interaction of ammonia with methyl formate the steps which comprise continuously passing methyl formate, ammonia and formamide as a seeding agent into the reaction zone, discontinuing the addition of the formamide after the reaction has started and continuously removing from the reaction zone the products of the reaction.

JOHN L. BRILL.
RICHARD W. PLUMMER.